United States Patent [19]

Powell, Jr.

[11] Patent Number: 5,174,094

[45] Date of Patent: Dec. 29, 1992

[54] AUTOMATIC BAGGING

[75] Inventor: Harry C. Powell, Jr., Faber, Va.

[73] Assignee: Powell Machinery, Inc., Faber, Va.

[21] Appl. No.: 784,471

[22] Filed: Oct. 24, 1991

[51] Int. Cl.$^5$ .................. B65B 1/32; B65B 7/12; B65B 43/16; B65B 43/30

[52] U.S. Cl. ................. 53/469; 53/483; 53/138.7; 53/370; 53/572; 53/248

[58] Field of Search ............... 53/503, 504, 502, 572, 53/248, 244, 385.1, 138.3, 138.4, 138.7, 468, 469, 475, 480, 481

[56] References Cited

U.S. PATENT DOCUMENTS

| | | | |
|---|---|---|---|
| 3,338,009 | 8/1967 | Stevens | 53/248 X |
| 3,401,499 | 9/1968 | Jahnke | 53/138.4 X |
| 3,731,454 | 5/1973 | Crabb | 53/138.7 X |
| 3,913,691 | 10/1975 | Powell, Jr. | 177/202 |
| 4,132,049 | 1/1979 | Mullins, Jr. | 53/572 X |
| 4,136,504 | 1/1979 | Wyslotsky | 53/504 X |
| 4,177,621 | 12/1979 | Powell, Jr. | 53/572 |
| 4,246,739 | 1/1981 | Rogerson | 53/504 X |
| 4,370,845 | 2/1983 | Perolls et al. | 53/572 |
| 4,534,156 | 8/1985 | Smith | 53/503 |
| 4,548,286 | 10/1985 | Sashiki et al. | 53/503 X |
| 4,791,776 | 12/1988 | Jackman et al. | 53/248 X |

Primary Examiner—Horace M. Culver
Attorney, Agent, or Firm—Nixon & Vanderhye

[57] ABSTRACT

An automatic bagging machine and method gently and efficiently handle bruisable articles to be automatically bagged, such as apples. The bagger includes a weighing pan, a bag supply, a source of compressed air for inflating a plastic bag while it is held open at spaced points adjacent its top, and a cushioning arm assembly for engaging the exterior of the bag as it is being filled with articles to cushion the fall of the articles. A piston and cylinder moves the cushioning arm into engagement with the bag exterior while it is being filled, and away from the bag after the fall of articles has been effectively broken (cushioned). A number of conveyors that are independently controlled feed articles to the pan, and an ultrasound sensor senses the volume of the next article or articles to be fed to the pan in each conveyor path, and that conveyor or conveyors is or are operated which contains the next article or articles closest to the desired weight of articles in the pan, or slightly above it. After being filled, the bag is moved by a pair of spaced grippers in a horizontal plane, with at least a slight twist imparted to the bag as it is moved, so that the open top of the bag at least starts to move to be closed. The open top is then moved into operative association with an automatic tier, and tied closed.

21 Claims, 7 Drawing Sheets

AUTOMATIC BAGGING

BACKGROUND AND SUMMARY OF THE INVENTION

The automatic bagging of articles, particularly the automatic bagging of bruisable articles, such as apples, in a packing plant, must be done efficiently in order for a packer to optimize his return on investment. It is necessary that the packer ensure that all bags have at least a certain predetermined minimum weight, but have as little weight over that minimum as practical. It is also necessary to move the bag in a path from a filling position to an automatic tier in such a way that the tying action is performed in the most reliable and efficient manner possible. Further, in recent years the concern for the handling of the bruisable articles has dramatically increased, and it is desirable in modern packing plants to ensure that the bruisable articles are handled as gently as possible during the automatic bagging operation, consistent with effective bagging techniques.

According to the present invention, an automatic bagger, and method of automatically bagging articles, are provided which allow a packer to efficiently bag bruisable articles—such as apples—so that the bags produced have a minimum weight over a determined target, and in such a manner that the tying action is optimized for reliability and efficiency, and in such a manner such that the fruit, or other bruisable articles, are handled as gently as practical.

According to one aspect of the present invention, an automatic bagger is provided which includes a pan (such as a weigh pan having a load cell associated therewith) with a dump end, and a piston and cylinder assembly or the like for tilting the pan to dump articles therein into a bag. The bagger also includes a bag supply means and pneumatic means for supplying air to a bag from the bag supply to inflate the bag and maintain it open. Gripper means are provided for holding the bag while it is supplied with the air, adjacent the pan dump end. According to the invention, cushioning means—such as one or more cushioning arms—are provided for engaging the bag exterior as it is being filled with articles from the pan for cushioning the fall of the articles, along with power means—such as a piston and cylinder arrangement—for moving the cushioning means into engagement with the bag exterior while it is being filled, and away from the bag after the fall of articles has been effectively cushioned. The cushioning arms brake the fall of fruit into the bag at one or more points so that the maximum vertical drop in any one path is reduced compared to the prior art situation in which all of the apples were merely dumped into the open top.

The grippers engage the bag at two different portions thereof while it is being held open with a bag stretcher to receive articles, but then as the bag is being moved to operative association with an automatic tier, it is no longer engaged by the bag stretcher. The grippers are moved from the filling position to the automatic tier in a generally horizontal plane, and in an arcuate pathway such that the spaced locations of the grippers come closer together, and the top of the bag is at least slightly twisted to partially close during movement toward operative association with the automatic tier.

In order to minimize the "overage" of product in the bag, the articles are fed to the weighing pan or the like in a plurality of different, separately controller paths (e.g. three different conveyance paths). Once a first predetermined level under the desired weight of articles has been sensed, all feed of articles to the pan in momentarily arrested. After an equilibrium weight of the articles in the weight pan has then been determined, the volume of the next article or articles in each conveyance path is sensed—as by an ultrasound means—and the next article or articles of the conveyance path having a projected weight—based upon its volume—closest to just over the predetermined weight of articles in the pan, is sensed, and then the conveyance path or paths with that "closest" article or articles is or are operated momentarily so that the article or articles is or are conveyed into the pan. After equilibrium is again established, the sensing and selective conveyance path operation steps are repeated if necessary.

A wheel is mounted adjacent the automatic tier to assist in directing the bag, in its horizontal plane of movement, into operative association with the automatic tier. The combination of the wheel, horizontal plane of movement, and grippers provides effective, reliable, automatic tying.

According to another aspect of the present invention, a method of bagging bruisable articles is provided. That method comprises the steps of automatically and substantially sequentially: (a) Inflating a plastic bag with air while holding it adjacent an open top thereof. (b) Dropping bruisable articles into the open top of the bag. (c) Cushioning the drop of bruisable articles into the bag by effectively reducing the height of drop of articles in any continuous vertical path. And, (d) tying the bag open top closed when the bag is full. Step (d) is preferably practiced by moving the bag in a horizontal plane from a position at which it is filled to an automatic tying machine; preferably by at least partially twisting the bag so that the open top thereof at least partially closes as the bag is moved from the filling position to the automatic tier.

The invention also contemplates a method of bagging articles by automatically and substantially sequentially practicing the steps of: (a) Inflating a plastic bag while holding it adjacent its open top. (b) Dropping articles into the bag at a filling position. (c) Moving the articles and the bag from the filling position, in a horizontal plane, while simultaneously at least slightly twisting the open of the bag, from the filling position to a tying position. And, (d) tying the open top of the bag closed at the tying position.

The invention also contemplates a method of bagging articles by automatically and substantially sequentially practicing the steps of: Inflating a plastic bag while holding it adjacent an open top thereof. Feeding articles to be bagged in a plurality of conveyance paths to a weighing mechanism. Once an initial weight close to, but not at, the selected weight has been reached, momentarily stopping the conveyance of articles to the weighing mechanism. Sensing the next article or articles in the plurality of conveyance paths which is or are of incremental value closest to the pre-selected weight and the actual weight of articles in the weighing mechanism. Conveying that selected article or articles into the weighing mechanism. Once the pre-selected weight, or an amount slightly greater than the pre-selected weight, has been reached, dropping the articles from the weighing mechanism into the open top of the bag. And, tying the open top of the bag closed.

It is the primary object of the present invention to provide for the simple yet effective and gentle automatic bagging of articles, particularly bruisable articles such as fruits and vegetables. This and other objects of the invention will become clear from an inspection of the detailed description of the invention, and from the appended claims.

DETAILED DESCRIPTION OF THE DRAWINGS

Figure 1:
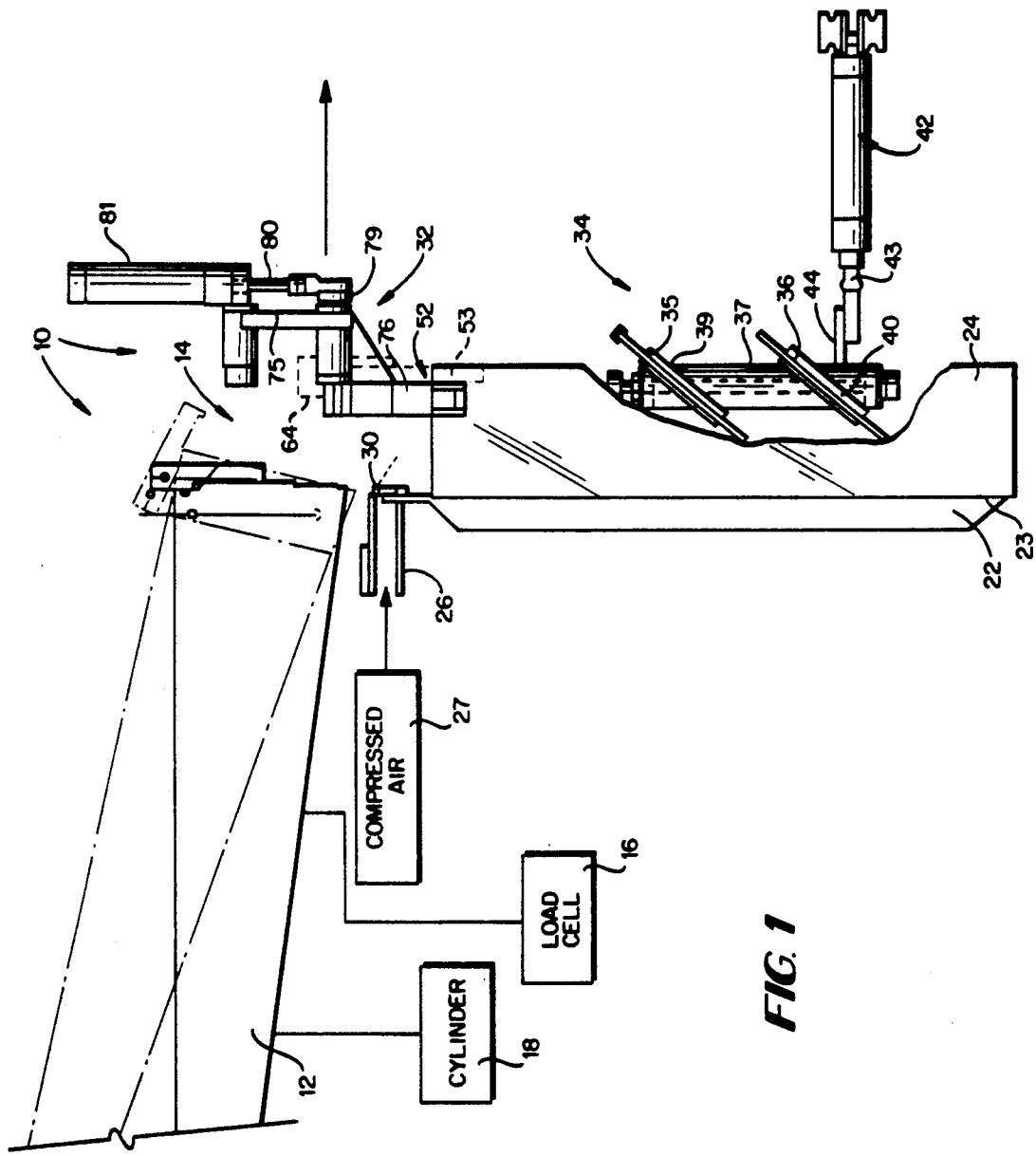
FIG. 1 is a side view of the actual bagging components of an exemplary automatic bagger according to the present invention.
Figure 2:
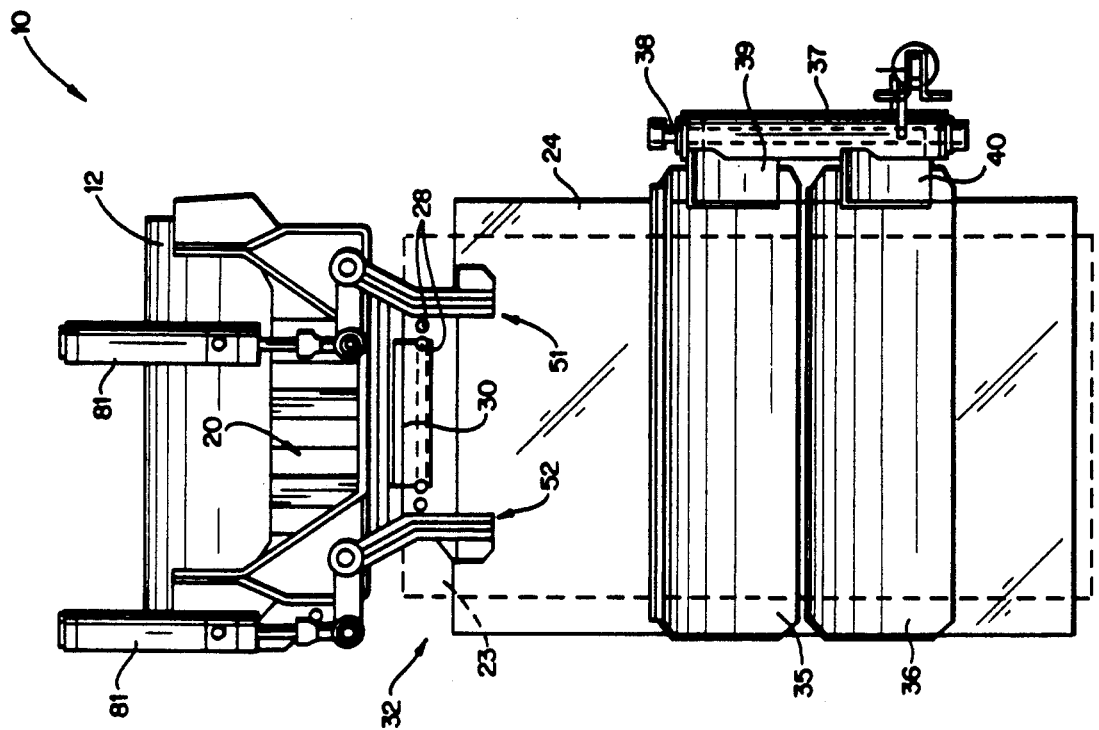
FIG. 2 is a rear view of the structure of FIG. 1.
Figure 3:
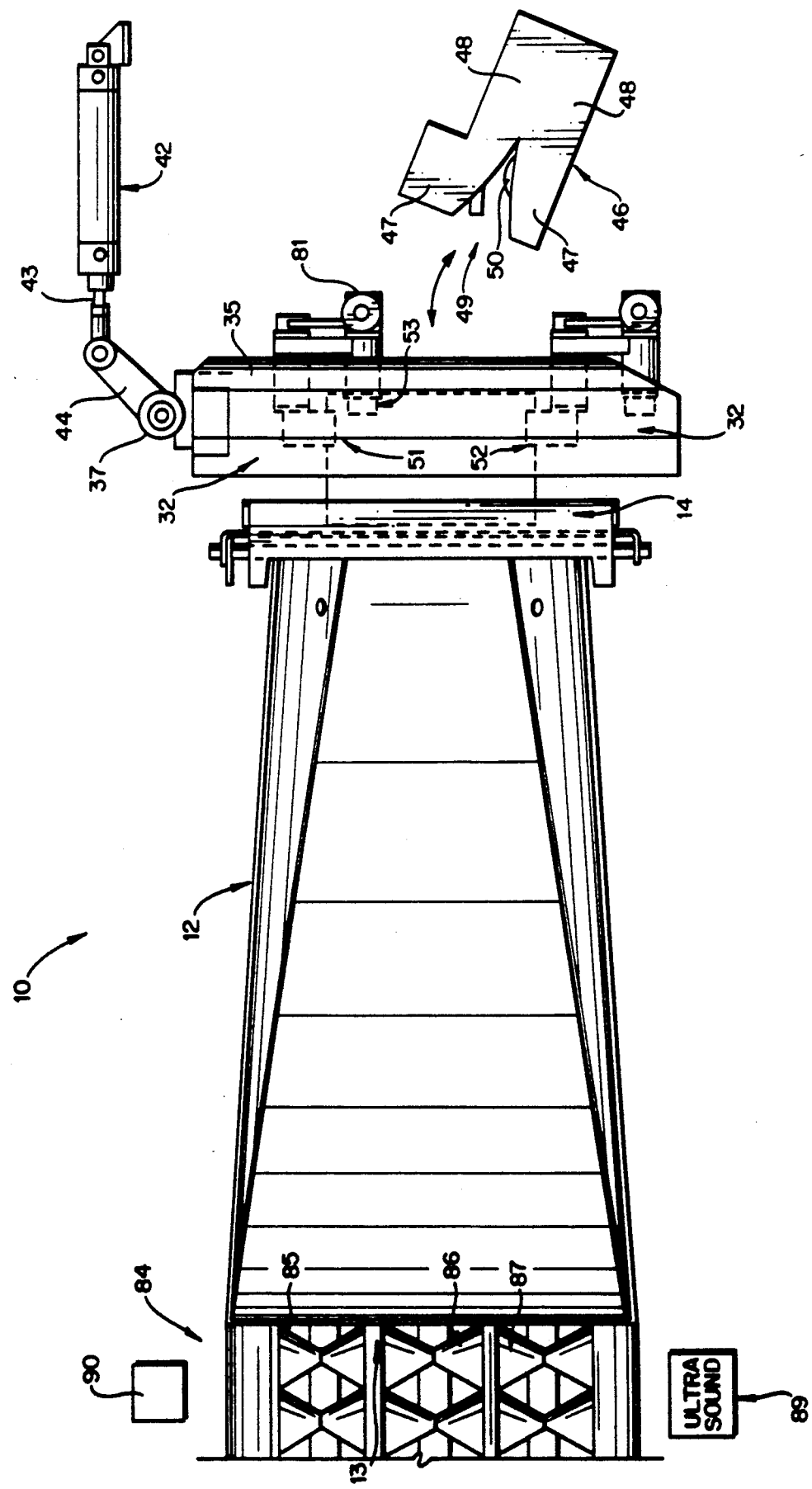
FIG. 3 is a top view of the structure of FIG. 1 shown in operative association with feed conveyors and an automatic bagger.
Figure 5:
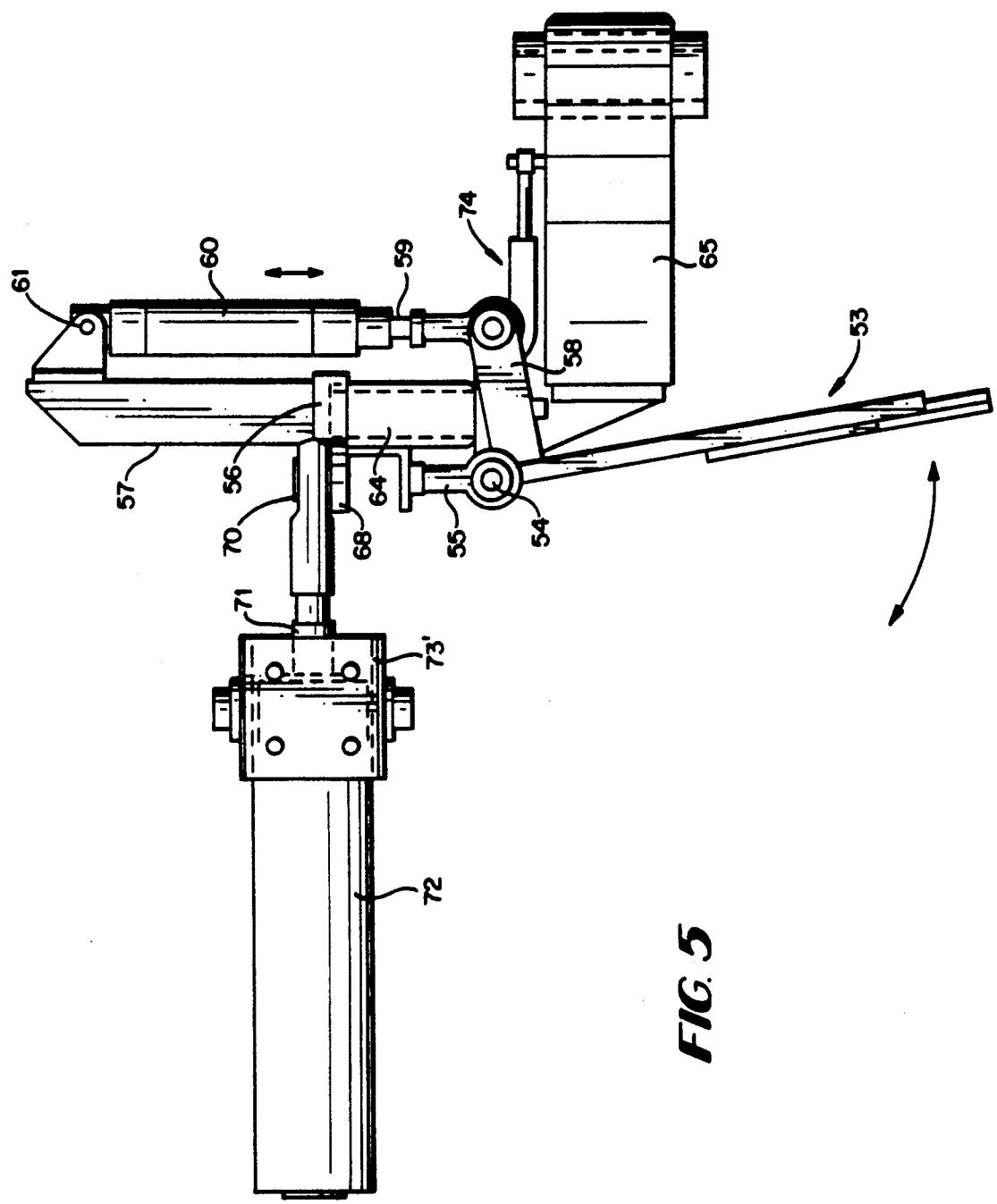
FIG. 5 is a side view of the bag stretcher component of the automatic bagger according to the invention, and the gripper moving mechanism associated with the apparatus of FIGS. 1 through 4.
Figure 6:
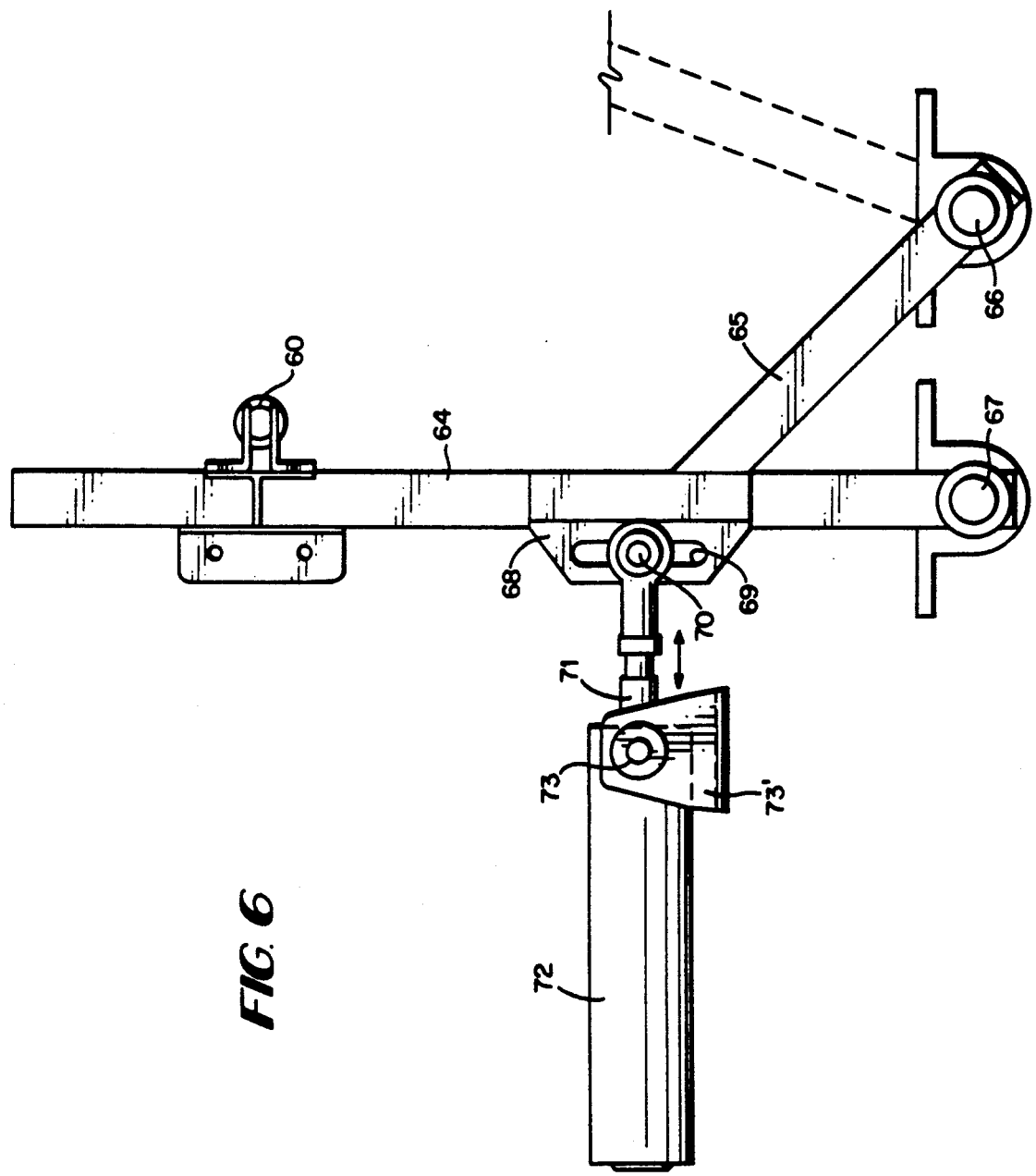
FIG. 6 is a top plan view of the structure of FIG. 5.
Figure 7:
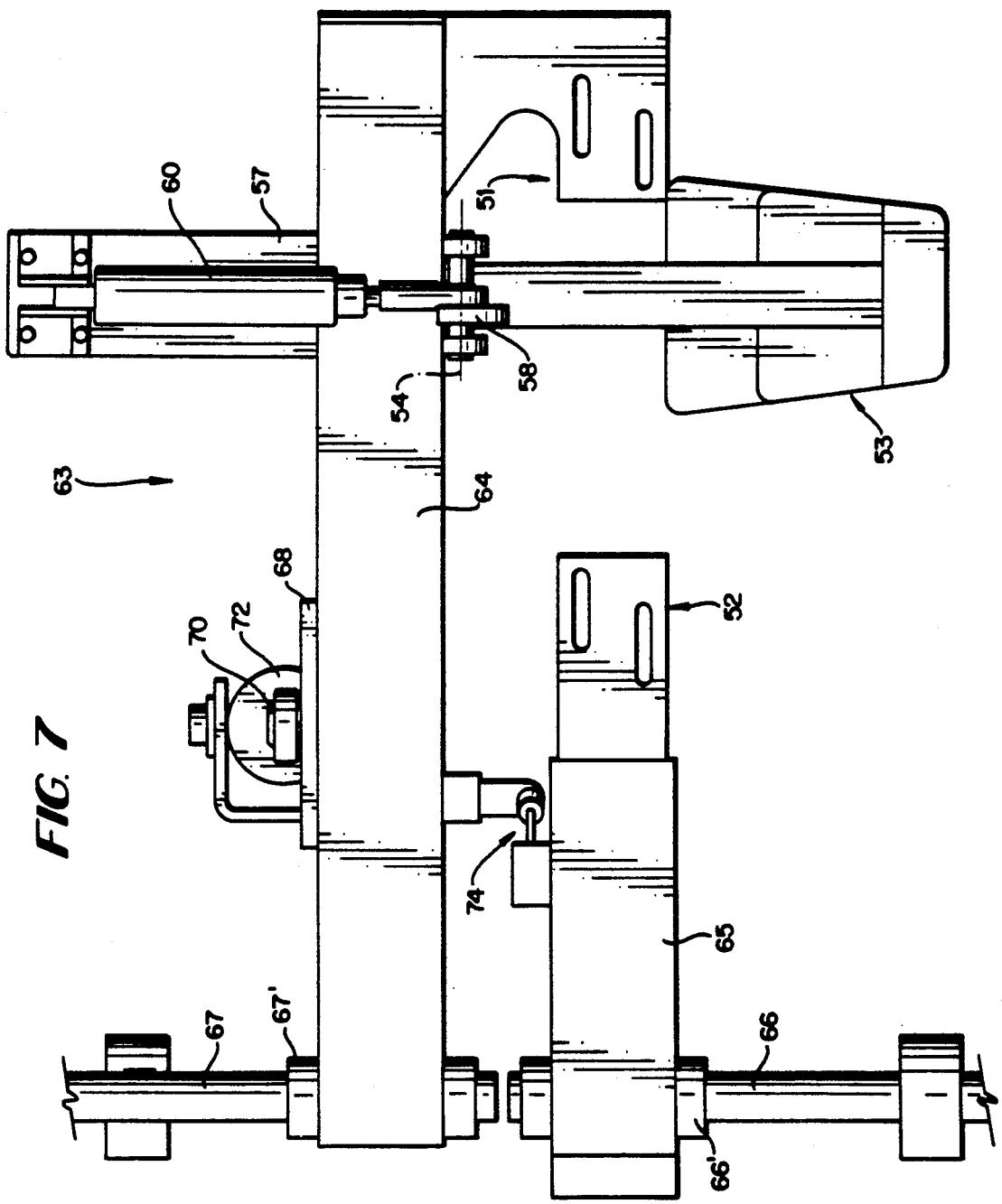
FIG. 7 is an end view of the apparatus of FIGS. 5 and 6.

An exemplary automatic bagger according to the present invention is shown generally by reference numeral 10 in FIGS. 1 through 3. The gripper mechanism is shown per se in FIG. 4. The mechanism for moving the grippers associated with the bagger 10 is shown in FIGS. 5-7, with the inter-relationship between it and the rest of the bagger shown in dotted line in FIG. 1.

One of the components of the bagger 10 comprises a pan 12, such as a typical weight pan generally of the same type as shown in U.S. Pat. No. 4,177,621 (the disclosure of which is hereby incorporated by reference herein), and having a dump end 14 and a feed end 13 (see FIG. 3). A load cell 16 is preferably associated with the pan 12, and a conventional pneumatic or hydraulic piston and cylinder assembly 18 is provided for pivoting the pan 12 about a horizontal axis to dump the contents thereof, through the dump end 14, into a plastic bag. At the dump end 14 of the pan 12 means 20 (see FIG. 2) are provided for providing drag on the falling articles to minimize their dropping velocity and—to some extent—singulate them, the means 20 preferably comprising simply a flap of rubber, cloth, or like cushioning material slit at one end to form fingers.

Just past, the typically below, the dump end 14 of the pan 12 is a conventional supply of plastic bags 22 with a front bag 23 associated therewith. In use, the front bag 23 is moved to the position illustrated in FIGS. 1 through 3 and denoted by reference numeral 24 and is blown open by air passing through conduit 26 from source 27 the air is directed into the open top of the bag 24 through openings 28 (see FIG. 2) in header 30. Gripper means—shown generally by reference numeral 32 in FIGS. 1 through 4—grip the bag 24 at two spaced locations at the open top thereof as it is filled with apples or other articles from the pan 12.

According to the present invention, bruising of the apples or other bruisable articles being dumped into the open top of the bag 24 is minimized by providing cushioning means for engaging the bag 24 exterior as it is being filled with articles for braking the fall of articles into the bag. The cushioning/braking means is illustrated generally by reference numeral 34 in FIGS. 1 through 3, and preferably comprises a pair of arms 35, 36 which extend generally horizontally, and are tilted back about a horizontal axis, with the bottom portions thereof engaging the exterior rear portion of the bag 24 (see FIG. 1) prior to filling.

The arms 35, 36 are connected to a generally vertically extending sleeve 37 having a pivot pin 38 therein defining a generally vertical axis of rotation, with flanges 39,40 connecting the arms 35, 36 to the sleeve 37. A cylinder 42 having a piston rod 43 associated therewith is connected via a link 44 to the sleeve 37 for rotating the arms 35, 36 about the vertical axis defined by the pivot pin 38. Initially, the piston rod 43 is retracted—as illustrated in FIGS. 1 through 3—so that the arms 35, 36 engage the rear of, and deform the bag 24.

Once the apples are dumped into the open top of the bag, they first impact the arm 35, having their fall broken, and then the arm 36, having their fall broken again, so that the maximum height that they drop is only from the bottom of the pan 12 to the first arm 35, rather than all the way to the bottom of the bag 24. Between the time that the bag filling operation starts and the time all of the apples have been dropped out of the pan 12, the cylinder 42 is actuated to extend the piston rod 43 so that the arms 35, 36 are pivoted away from the bag, and the bag assumes a full volume configuration. The arms 35, 36 are provided entirely out of the way of the bag 24 so that when the bag is moved into operative association with an automatic tier (as hereinafter explained) the cushioning means 34 do not interfere with that movement.

Preferably the arms 35, 36 are either made of a cushioning (e.g. resilient, bendable, and/or flexible) material, or they are covered with foam, cloth, or a like cushioning material.

The automatic bagger 10 is typically associated with a conventional automatic tier, such as illustrated schematically at 46 in FIG. 3. The automatic tier 46 may be of any conventional commercially available type, such as "Do-Boy", which has a pair of horizontally extending arms 47 with substantially flat, substantially horizontal top surfaces 48 thereof defining an elongated, tapered, gap or opening 49 therebetween. A vertical axis wheel 50 (see FIG. 3) is, according to the invention, associated with the otherwise conventional tier 46. The bagger 10 according to the present invention can effectively move a bag full of articles so that the top thereof passes into the opening 49, in a reliable and effective manner. This minimizes down time as occurs if a bag is not properly moved into operative association with an automatic tier 46.

The mechanism for moving filled bags into operative association with the automatic tier 46 includes elements 51 and 52 for mounting the grippers 32, as well as a bag stretcher 53. The bag stretcher 53 engages the open top of the bag 24—as it is being filled—along with the grippers 32, at the center rear of the bag 24. The bag stretcher 53 is mounted for pivotal movement about a horizontal axis defined by pivot pin 54, mounted in a sleeve/arm 55 which in turn is connected to a support 56. Upstanding from the support 56 is a vertical arm 57. An arm 58 is connected at one end thereof to the bag stretcher 53, and at the other end thereof is pivotally connected to a piston rod 59 of cylinder 60. The cylinder 60 is pivotally connected at the end thereof opposite the piston rod 59—see pivot connection 61—to the vertical arm 57. When the piston rod 59 is in the position illustrated in FIG. 5, the bag stretcher 53 is moved against the back of the bag 24 to keep the open top of the bag open, and when the cylinder 60 is filled with fluid so as to move the piston rod 59 downwardly is viewed in FIG. 5, the bag stretcher 53 moves toward the center of the bag, and no longer stretches the top thereof open.

The structure 63 (see FIG. 7) comprises means for moving the gripper mounting plates 51, 52 so as to convey a filled bag from the filling position to the automatic bag tying machine 46. The means 63 conveys the bag in such a way that the grippers 32 carried by plates 51, 52 move closer together, and at least a partial twisting action is imparted to the top of the bag 24.

The apparatus 63 includes a "left arm" 64 for the gripper 32 associated with plate 51, and a "right arm" 65 for the gripper 32 associated with plate 52. Right arm 65 is mounted on shaft 66 which defines an axis of rotation, the sleeve 66' connected to the arm 65 receiving the shaft 66, while the arm 64 is operatively connected to a second shaft 67 defining the vertical axis of rotation, through the sleeve 67'. The axes defined by the shafts 66, 67 are parallel, but horizontally spaced from each other, and the arms 64, 65 are vertically spaced from each other (as seen in all of FIGS. 5 through 7). The structures 56, 57 are mounted on the left arm 64, as also seen in all of FIGS. 5 through 7.

To effect movement of the arms 64, 65, a power means is provided, operatively connected to the plate 68 having an elongated slot 69 therein. A pin 70 passes through the slot 69, and is connected to the piston rod 71, which in turn is connected to hydraulic cylinder 72 or the like, which itself is pivotal about pivot pin 73 received in stationary U-bracket 73'. When the cylinder 72 is supplied with fluid, the rod 71 is elongated, pivoting both the arms 64, 65 about their respective axes 67, 66, as indicated by the dotted lines in FIG. 6, which in turn moves the bag carried by the grippers 32 into contact with the guiding wheel 50, and directly into operative association with the automatic tier 46. Since the grippers 32 pivot about spaced axes, they will move closer together as they move toward the automatic tier 46, and at least a partial twisting action will be imparted to the bag, which facilitates its movement into operative association with the automatic tier 46, and the tying action provided thereby.

An adjustable length rod 74 connects the arms 64, 65 for movement together (see FIGS. 5 and 7).

Figure 4:
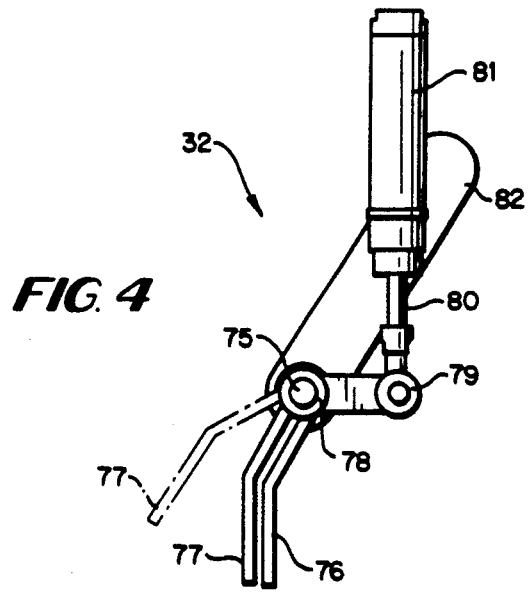
FIG. 4 is a detail end view of an exemplary gripper means utilized in the apparatus of FIGS. 1 through 3.

FIG. 4 illustrates the details of a particular gripper 32, which is mounted to a plate 51, 52. The gripper 32 includes a generally horizontally extending shaft 75 (see FIG. 4) having gripper elements 76, 77, which are each provided at one end thereof with a collar 78, to the shaft 75. While the gripper element 76 remains stationary, the element 77 and collar 78 thereof are connected by a link 79 to a reciprocal piston rod 80 received within a hydraulic or pneumatic cylinder 81. When the rod 80 is reciprocated downwardly (as viewed in FIG. 4) from the cylinder 81, the gripper portion 77 moves upwardly, effecting release of the bag held thereby. When the rod 80 is retracted (as illustrated in FIG. 4), the gripper elements 76, 77 are adjacent each other and tightly grip a bag 24 therebetween.

The conveyor mechanism 84 (see FIG. 3) associated with the pan 12, and the rest of the automatic bagging components, allows a minimum amount of "overage" of weight into a bag, while still ensuring that the bag does have at least a minimum amount therein. The conveyor 84 comprises three separate conveyor mechanisms (or another plurality of such mechanisms), 85, 86, and 87. They are driven by three separate motors, 85', 86', and 87' (see FIG. 8). During the initial stages of filling of the weight pan 12, all conveyors 85-87 are actuated so that apples, or other bruisable articles being bagged, are fed from all of them into the weight pan 12. However once an initial threshold weight has been reached in the weight pan 12, and then the weight pan reaches equilibrium, the conveyors 85 through 87 are selectively activated so as to move the next apple or apples on any one (or more) of the conveyors 85-87 which is or are closest in weight (although slightly over) to the desired weight of the bag so as to make sure that the bag is "full", but so that a minimum amount of overage is provided.

In order to determine which "next" apple or apples is or are the desired apple or apples for the purposes of the invention, preferably a conventional ultrasound emitter 89 and sensor 90 may be provided. These provide a means for roughly determining the mass of the next apple by determining their volume. Signals from the ultrasound emitter 89 are directed at each of the "next" apples, and depending upon the signals received by the receiver 90, the relative volumes thereof are determined. Those relative volumes are compared to what expected weights for those particular articles will be, and then the appropriate "weight" of apple or apples is or are selected. Of course it may be that the volume/weight ratios are not exactly correct, or that the apples was turned in a particular way during ultrasound detection, etc., so that a completely accurate reading was not provided. However in any event the load cell 16 associated with the weigh pan 12 will determine whether or not the bag has at least the minimum weight, and if it does not then sensing with the ultrasound structure 89/90, and operation of one (or more) of the conveyors 85-87, will take place again until enough weight of apples is in the pan 12 to provide a "full" bag.

Figure 8:
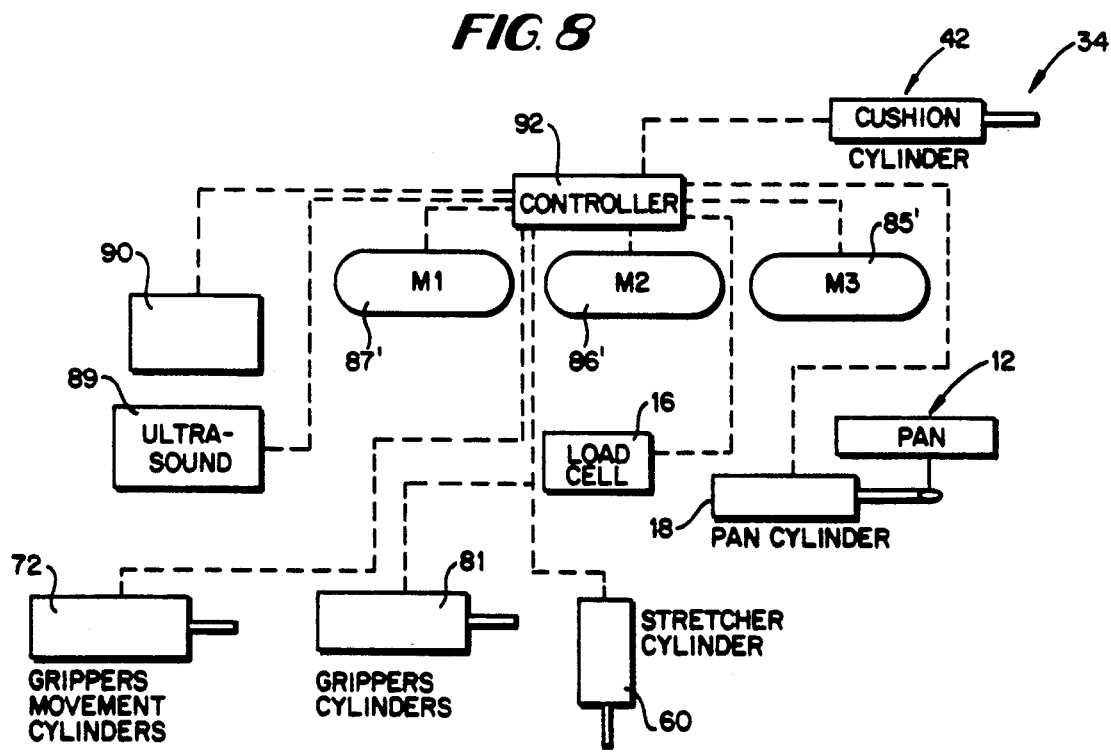
FIG. 8 is a control schematic showing the inter-relationship among the components of the apparatus of FIGS. 1 through 7.

FIG. 8 schematically illustrates the interconnection between the components heretofore described, using a common controller (computer) 92. Note that the controller 92 controls all of the cylinders and motors associated with the apparatus 10, as well as interacting with the load cell 16 and the ulstrasound sensing system 89/90.

Utilizing the apparatus 10 heretofore described, a method of bagging bruisable articles may be provided, comprising the steps of automatically:

(a) Inflating (with air from source 27) a plastic bag (24) while holding it adjacent its open top (with grippers 32); (b) Dropping bruisable articles into the bag (by activating cylinder 18 to dump the contents of weight pan 12 into the open top of the bag through the retarding flaps 20); (c) Cushioning the drop of the bruisable articles into the bag 24 by effectively reducing the height of drop of articles in any continuous vertical path (by actuating cylinder 42 to bring the cushion arms 35, 36 into contact with the bag 24 as illustrated in FIG. 1); and (d) Tying the bag when full (with automatic tier 46). Between steps (c) and (d), the cylinder 60 is actuated to stretch open the bag 24 with stretcher 53 until it has been filled, and then activated again so that the bag 24 is no longer stretched. Also, the cylinder 42 is activated so as to move away from the bag 24, and the cylinder 72 is activated to move the grippers 32 toward the automatic tier 46. Once the bag 24 is in operative association with the automatic tier 46, the cylinders 81 are activated to move the gripper elements 76, 77 apart so that the bag 24 is released, and then it is automatically tied by the tier 46. The movement of the grippers 32 about different axes 66, 67 imparts a slight twisting action to the bag and facilitates its guided movement into operative and positive association with the automatic tier 46. The cylinder 72 is then activate to return the gripper to engage a new bag 24 from the stack 23, the gripper elements 76, 77 being moved together at that juncture to effect gripping at opposite ends of the open top of the new bag 24.

When the pan 12 is being filled, the conveyors 85–87 initially convey all the apples therefrom into the pan, but once a threshold weight is reached all of the conveyors 85–87 are stopped, and once the pan 12 reaches equilibrium if additional weight is needed for a "full" bag, the sensor 89/90 determines the most likely candidate or candidates of the next of the apples on each conveyor 85–87 to achieve a "full" bag, and then the appropriate conveyor or conveyors 85–87 having the desired "next" apple or apples associated therewith is or are operated so as to move the apple or apples into the pan 12.

It will thus be seen that according to the present invention an effective automatic bagger has been provided which overcomes a number of problems inherent in the prior art. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. An automatic bagger comprising:
   a pan, including a dump end;
   means for tilting said pan;
   a load cell associated with said pan for weighing articles on said pan;
   a bag supply means containing bags having an interior, and a plurality of exterior sides;
   pneumatic means for supplying air to a bag from said bag supply means to maintain the bag open;
   gripper means for holding a bag while it is supplied with air, adjacent said pan dump end;
   cushioning means for engaging only one bag exterior side as the bag is being filled with articles from said pan for cushioning the fall of said articles; and
   power means for moving the cushioning means into engagement with only one bag exterior side while the bag is being filled, and away from the bag after the fall of articles has been effectively cushioned.

2. A bagger as recited in claim 1 wherein said gripper means comprises means for gripping the bag at the open top of the bag, and wherein said cushioning means comprises means for engaging the bag over a wide area spaced from and below said gripper means.

3. A bagger as recited in claim 2 wherein said cushioning means engages the bag above the bottom of the bag.

4. A bagger as recited in claim 3 wherein said cushioning means comprises a pair of generally horizontally extending arms, each of said arms having cushioning material covering at least the portions thereof adapted to engage a bag.

5. A bagger as recited in claim 4 wherein said means for moving said cushioning means comprises a piston and cylinder.

6. A bagger as recited in claim 1 wherein said cushioning means comprises a pair of generally horizontally extending arms, each of said arms having cushioning material covering at least the portions thereof adapted to engage a bag.

7. A bagger as recited in claim 1 wherein said gripper means engages a bag at two different, spaced portions, thereof while the bag is being held open to receive articles therein, and a bag stretcher engages the bag at a third portion, stretching the bag open.

8. A bagger as recited in claim 2 in combination with an automatic tier for tying the bag closed; and further comprising means for mounting said gripper means for movement in a substantially horizontal plane from a first position engaging a bag and holding it open to receive articles therein, to a second position in which the bag is in operative association with the automatic tier.

9. An automatic bagger comprising:
   a pan, including a dump end;
   means for tilting said pan;
   a load cell associated with said pan for weighing articles on said pan;
   a bag supply means;
   pneumatic means for supplying air to a bag from said bag supply means to maintain the bag open;
   gripper means for holding a bag while it is supplied with air, adjacent said pan dump end;
   cushioning means for engaging the bag exterior as it is being filled with articles from said pan for cushioning the fall of said articles;
   power means for moving the cushioning means into engagement with a bag exterior while the bag is being filled, and away from the bag after the fall of articles has been effectively cushioned;
   an automatic tier for tying the bag closed; and
   means for mounting said gripper means for movement in a substantially horizontal plane from a first position engaging a bag and holding it open to receive articles therein, to a second position in which the bag is in operative association with said automatic tier.

10. A bagger as recited in claim 9 wherein the automatic tier has a pair of arms between which the bag is received for automatic tying, the arms having flat tops, and wherein said means for mounting said gripper arms mount the gripper arms so that they move in a horizontal plane just above the flat tops of said tier arms.

11. A bagger as recited in claim 10 further comprising a wheel associated with said tier for engaging a bag as it is moved by said gripper means into operative association with said tier to positively guide the bag into place between the tier arms.

12. An automatic bagger comprising:
   a pan, including a dump end;
   a bag supply means;
   means for tilting said pan to empty the contents thereof;
   pneumatic means for supplying air to a bag from said bag supply means to maintain the bag open;
   gripper means for holding a bag while it is supplied with air, adjacent said pan dump end, said gripper means for gripping the bag at an open top end thereof;
   an automatic tier; and means for moving said gripper means in a generally horizontal plane from a position in which it holds the bag open adjacent said pan, to a second position in which the bag open top is at least partially closed, and is moved into operative association with said automatic tier.

13. A bagger as recited in claim 12 wherein said gripper means engages a bag at two different, spaced portions, thereof while the bag is being held open to receive articles therein, and a bag stretcher engages the bag at a third portion, stretching the bag open.

14. A bagger as recited in claim 13 wherein said gripper means engages the bag at only first and second spaced locations after the bag is filled, and wherein said moving means move said first location along a dramatically different arc than said second location so that said first and second locations come closer together at said tier and said bag it at least partially twisted.

15. A method of bagging bruisable articles comprising the steps of automatically and substantially sequentially:
(a) inflating a plastic bag with air while holding it adjacent an open top thereof;
(b) dropping bruisable articles into the open top of the bag;
(c) cushioning the drop of bruisable articles into the bag by effectively reducing the height of drop of articles in any continuous vertical path by engaging the bag at only one exterior side thereof with a cushioning arm and then after the fall has been cushioned, moving the cushioning arms away from the bag; and
(d) tying the bag open top closed when the bag is full.

16. A method as recited in claim 15 wherein step (d) is practiced by moving the bag open top in a horizontal plane from a position at which it is filled to an automatic tying machine.

17. A method as recited in claim 16 wherein step (d) is further practiced by at least partially twisting the bag so that the open top thereof at least partially closes as the bag is moved from the filling position to the automatic tier.

18. A method of bagging bruisable articles comprising the steps of automatically and substantially sequentially:
(a) inflating a plastic bag while holding it adjacent its open top;
(b) dropping articles into an open top of the bag at a filling position; then
(c) moving the open top of the bag from the filling position, in a horizontal plane, while simultaneously at least slightly twisting the open top of the bag, to a tying position;
(d) tying the open top of the bag closed at the tying position.

19. An automatic bagger comprising:
a pan, including a dump end;
means for tilting said pan;
a load cell associated with said pan for weighing articles on said pan;
a bag supply means;
pneumatic means for supplying air to a bag from said bag supply means to maintain the bag open;
gripper means for holding a bag while it is supplied with air, adjacent said pan dump end;
cushioning means for engaging the bag exterior as it is being filled with articles from said pan for cushioning the fall of said articles;
power means for moving the cushioning means into engagement with a bag exterior while the bag is being filled, and away from the bag after the fall of articles has been effectively cushioned; and
wherein said cushioning means comprises a pair of generally horizontally extending arms, each of said arms having cushioning material covering at least the portions thereof adapted to engage a bag.

20. A bagger as recited in claim 19 wherein said generally horizontal extending arms have a surface thereof on which cushioning material is disposed slanted so as to deflect bruisable articles falling through the bag which engage the portions of the bag engaged by said arms.

21. An automatic bagger comprising:
a pan, including a dump end;
means for tilting said pan;
a load cell associated with said pan for weighing articles on said pan;
a bag supply means;
pneumatic means for supplying air to a bag from said bag supply means to maintain the bag open;
gripper means for holding a bag while it is supplied with air, adjacent said pan dump end;
cushioning means for engaging the bag exterior as it is being filled with articles from said pan for cushioning the fall of said articles;
power means for moving the cushioning means into engagement with a bag exterior while the bag is being filled, and away from the bag after the fall of articles has been effectively cushioned; and
wherein said gripper means engages a bag at two different, spaced portions, thereof while the bag is being held open to receive articles therein, and a bag stretcher engages the bag at a third portion, stretching the bag open.

* * * * *